United States Patent [19]

Inumada

[11] Patent Number: 5,021,620
[45] Date of Patent: Jun. 4, 1991

[54] HIGH FREQUENCY HEATING APPARATUS WITH A TEMPERATURE COMPENSATED SWITCHING ELEMENT

[75] Inventor: Masato Inumada, Seto, Japan
[73] Assignee: Kabushiki Kaisha Toshiba, Kanagawa, Japan
[21] Appl. No.: 551,467
[22] Filed: Jul. 12, 1990

[30] Foreign Application Priority Data

Aug. 10, 1989 [JP] Japan .................................. 1-207185

[51] Int. Cl.$^5$ .............................................. H05B 6/68
[52] U.S. Cl. .............................. 219/10.55 B; 219/492; 363/21; 363/97; 323/907
[58] Field of Search .................. 219/10.55 B, 10.55 R, 219/10.55 E, 492, 494; 363/21, 56, 97, 131; 323/907

[56] References Cited

U.S. PATENT DOCUMENTS

| | | | |
|---|---|---|---|
| 4,318,165 | 3/1982 | Kornrumpf et al. | 363/21 |
| 4,481,393 | 11/1984 | Ueda | 219/10.55 B |
| 4,694,239 | 9/1987 | Marchio' et al. | 323/907 |
| 4,777,575 | 10/1988 | Yamato et al. | 363/21 |
| 4,866,589 | 9/1989 | Satoo et al. | 219/10.55 B |

FOREIGN PATENT DOCUMENTS 1-133866  11/1990  Japan .

Primary Examiner—Philip H. Leung
Attorney, Agent, or Firm—Philip M. Shaw, Jr.

[57] ABSTRACT

A microwave oven includes an inverter inducing a high frequency oscillating current at a primary winding of a transformer via a switching element turned on and off, a magnetron to which a high voltage is applied by the transformer, a temperature sensor sensing the temperature of heat generated by the switching element to thereby generate a temperature signal, and a microcomputer compensating "on" and "off" periods of the switching element in response to the temperature signal from the temperature sensor so that an increase in an amount of an anode current in the magnetron is restrained with an increase of the temperature sensed by the temperature sensor. The microcomputer also functions to deenergize the switching element when the temperature of the switching element sensed by the temperature sensor exceeds a predetermined value.

2 Claims, 1 Drawing Sheet

HIGH FREQUENCY HEATING APPARATUS WITH A TEMPERATURE COMPENSATED SWITCHING ELEMENT

BACKGROUND OF THE INVENTION

This invention relates to a high frequency heating apparatus wherein a DC voltage obtained by rectifying in a rectification circuit a high frequency voltage produced by an inverter circuit is applied to a magnetron, thereby driving the same, and more particularly to such a high frequency heating apparatus provided with compensation means for compensating an anode current of the magnetron so that it is maintained at a predetermined value.

A conventional high frequency heating apparatus of the above-described type such as a microwave oven comprises rectification means for converting a commercial AC power supply voltage to DC voltage and inverter means including a switching element and a transformer which also serves as inductance coil means. The DC voltage from the rectification means is applied to the transformer through the switching element turned on and off so that a high frequency voltage is obtained at the inverter means. The high frequency heating apparatus further comprises a magnetron connected to a high frequency rectifying circuit through which the DC voltage from a transformer secondary winding is applied to the magnetron and a control circuit for controlling "on" and "off" periods of the switching element so that the magnetron anode current is controlled. The inverter means is provided for the purpose of reducing the size of the transformer employed to obtain a high voltage which is applied to the magnetron.

In accordance with the above-described high frequency heating apparatus, the magnetron is oscillated upon application of the DC voltage thereto. As a result, microwave energy is generated by the magnetron and radiated to foodstuff, which is cooked. When the magnetron is continuously driven, a permanent magnet of the magnetron is heated as the result of generation of heat by the magnetron. Consequently, the number of magnetic fluxes induced is reduced with the increase in the temperature of the permanent magnet. An amount of anode current of the magnetron is increased with the temperature increase of the permanent magnet and accordingly, an amount of the high frequency energy generated is also increased therewith. In order to prevent the amount of the magnetron anode current from being uselessly increased, a current transformer is conventionally provided at the primary winding side of the transformer for detecting a transformer input current and current control means is provided for controlling the switching element in response to a current detection signal from the current transformer so that the magnetron anode current is maintained at a predetermined value. Alternatively, the current transformer is provided at the secondary winding side of the transformer. However, these conventional arrangements for solving the above-described problem necessitates a current transformer which is expensive to be produced. Furthermore, the provision of the current transformer at the primary or secondary winding side of the transformer complicates the construction of insulation between the current transformer and transformer, which also increases the production cost of the high frequency heating apparatus.

SUMMARY OF THE INVENTION

Therefore, an object of the present invention is to provide an improved high frequency heating apparatus wherein a simple and inexpensive arrangement is provided for maintaining the magnetron anode current at a predetermined value.

Another object of the present invention is to provide an improved high frequency heating apparatus wherein the magnetron can be deenergized immediately after the magnetron anode current reaches an abnormal value.

To achieve these and other objects, the present invention provides a high frequency heating apparatus comprising rectification means for converting an AC voltage to a DC voltage, inverter means comprising a switching element and inductance coil means, the DC voltage from the rectification means being applied to the inductance coil means through the switching element turned on and off such that a high frequency voltage is obtained, a magnetron connected to a high frequency rectification circuit rectifying an AC voltage from the inverter means to a DC voltage, which DC voltage is applied to the magnetron, control circuit means for controlling "on" and "off" periods of the switching element so that an anode current of the magnetron is controlled, temperature sensing means for sensing the temperature of the switching element, thereby producing a temperature signal, and compensation means for compensating the "on" and "off" periods of the switching element in response to the temperature signal so that an increase in an amount of the magnetron anode current is restrained with an increase of the temperature of the switching element sensed by the temperature sensing means.

It is preferable that deenergizing means be additionally provided for deenergizing the switching element when the temperature of the switching element sensed by temperature sensing means exceeds a predetermined value, thereby deenergizing the magnetron.

The switching element usually comprises a switching transistor which generates heat as the result of collector dissipation with the passing of a collector current. An amount of the heat generated by the switching transistor depends upon the magnitude of the collector current. The temperature of the switching transistor increases as the continuous drive of the magnetron increases the temperature thereof with the result of the increase in the amount of the anode current. In response to the temperature signal generated by the temperature sensing means for sensing the temperature of the heat generated by the switching transistor, the compensation means controls the "on" and "off" periods of the switching transistor so that the amount of the anode current is restrained. In this regard, the anode current is controlled by controlling a ratio of the "on" and "off" periods of the switching transistor, for example, in an inverter circuit.

Other objects of the present invention will become obvious upon an understanding of an illustrative embodiment about to be described or will be indicated in the appended claims. Various advantages not referred to herein will occur to one skilled in the art upon employment of the invention in practice.

DESCRIPTION OF THE PREFERRED EMBODIMENT

An embodiment in which the invention has been applied to a microwave oven will now be described with reference to the accompanying drawings.

Figure 1:
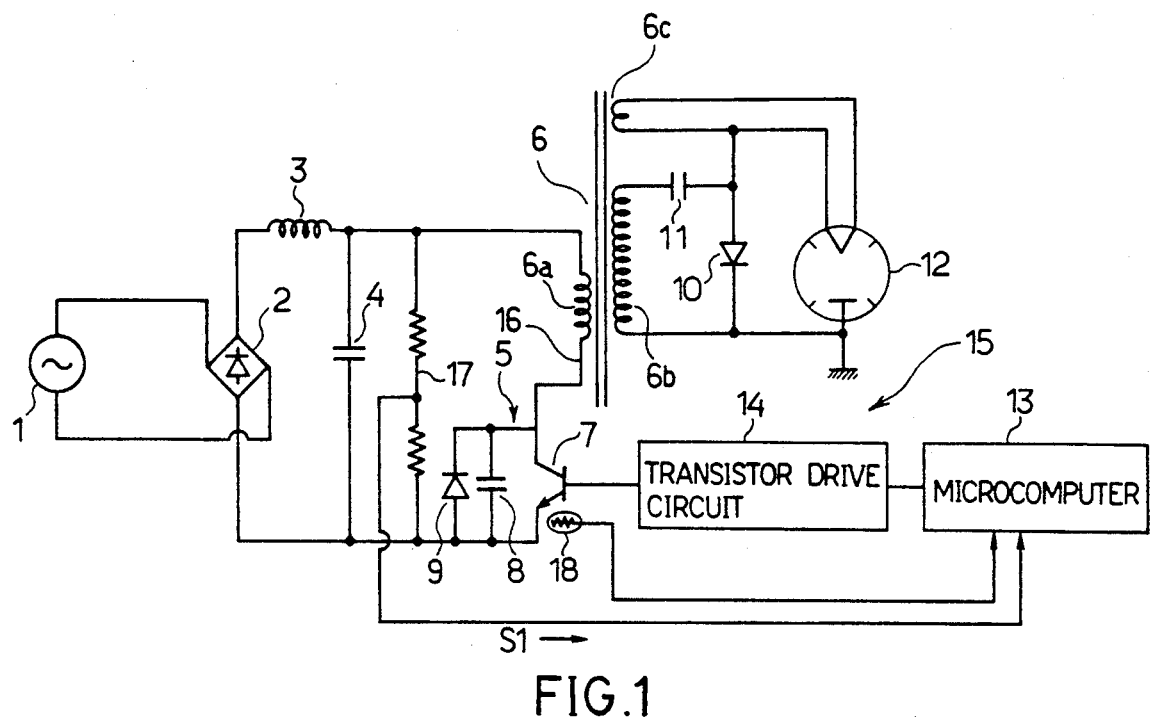
FIG. 1 is a connection diagram of magnetron drive circuitry employed in a high frequency heating apparatus of an embodiment of the invention.

Referring first to FIG. 1, an AC voltage from a commercial AC power source 1 is rectified by a bridge-connected diode 2 as a rectification circuit and smoothed by a choke coil 3 and smoothing capacitor 4, thereby obtaining a DC voltage. The DC voltage is converted by an inverter circuit 5 to a high frequency voltage which is at a frequency of approximately 30 KHz. The inverter circuit 5 comprises a primary winding 6a of a step-up transformer 6 also serving as an inductance coil, a switching transistor 7 as a switching element, a resonance capacitor 8 and a diode 9. An output from a secondary winding 6b of the transformer 6 is half wave rectified by high frequency rectification means or rectifying diode 10 and capacitor 11 and then, supplied to a magnetron 12.

A tertiary winding 6c of the transformer 6 is employed for energizing a heater of the magnetron 12. High frequency energy generated by the magnetron 12 is propagated into a cooking chamber of the microwave oven to thereby heat foodstuff placed therein.

Figure 2:
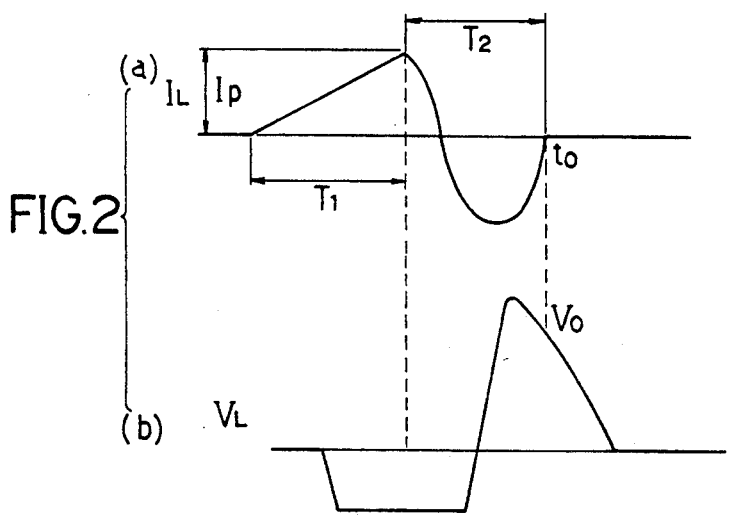
FIGS. 2(a), and 2(b) show a current at the primary winding side and voltage waveform at the primary winding side of a step-up transformer which also serves as an inductance coil of an inverter circuit, respectively.
Figure 3:
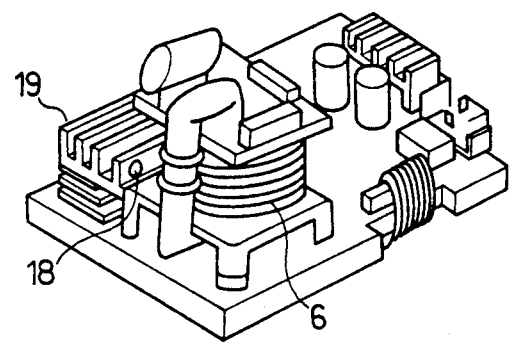
FIG. 3 is a perspective view of an electronic circuit unit including circuit elements shown in FIG. 1 except a magnetron.

The switching transistor 7 of the inverter circuit 5 is on-off controlled by a control circuit 15 comprising a microcomputer 13 and transistor drive circuit 14. For attainment of the on-off control of the switching transistor 7, a voltage dividing resistor circuit or voltage divider 17 is connected in parallel to an oscillation circuit 16 comprising a series circuit of a primary winding 6a and resonance capacitor 8. When the switching transistor 7 is on-off controlled in the inverter circuit 5, an oscillating current $I_L$ and oscillating voltage $V_L$ are produced at an oscillatory circuit 16, as is shown in FIGS. 2(a) and 2(b) in which reference symbol T1 designates an "on" period of the switching transistor 7 and T2 a free oscillation period. The oscillating voltage is detected by the voltage dividing resistor circuit 17 to be supplied to the microcomputer 13 as a synchronous signal s1. Consequently, the switching transistor 7 is controlled so that the time when the switching transistor 7 is initiated to be turned on is synchronized to the time when the oscillating voltage $V_L$ reaches the value V0 corresponding to a zero-cross point t0 of the oscillating current $I_L$. FIG. 3 illustrates an appearance of an electronic circuit unit including circuit elements shown in FIG. 1 except the magnetron 12. Temperature sensing means, for example, a temperature sensor 18 comprised of a thermistor is mounted, in the heat transfer relation, on one of radiating fins 19 (see FIG. 3) by screw means, to which fins the switching transistor 7 is secured. The temperature sensor 18 senses the temperature of the switching transistor 7 and generates a temperature signal, which is supplied to the microcomputer 13.

When the temperature sensed by the temperature sensor 18 exceeds, for example, 40° C., the microcomputer 13 controls the switching transistor 7 so that the "on" period T1 thereof is shortened. See FIG. 2(a). In the embodiment, particularly, the microcomputer 13 also functions as compensation means to control the switching transistor 7 so that every time the temperature sensed by the sensor 18 is increased by 5° C. in the temperature range between 40° C. and 60° C. or when the temperature reaches each of the values of 45° C., 50° C., 55° C. and 60° C., the "on" period T1 of the switching transistor 7 is sequentially shortened. When the temperature sensed by the temperature sensor 18 exceeds a predetermined value, for example, 65° C., the microcomputer 13 functions to deenergize the switching transistor 7.

In operation of the above-described microwave oven, the magnetron 12 generates microwave energy which is at a frequency of approximately 2,450 MHz, the microwave energy being supplied into the cooking chamber. When the amount of the anode current is increased with rise of the temperature of the magnetron 12, the amount of the oscillating current $I_L$ is increased. Consequently, an amount of heat generated by the switching transistor 7 is increased and accordingly, the temperature thereof is increased. The temperature signals are sequentially supplied from the temperature sensor 18 to the microcomputer 13 during the operation of the high frequency heating apparatus. The microcomputer 13 controls the switching transistor 7 so that the "on" period thereof is sequentially shortened every time the temperature sensed by the sensor 18 is increased by 5° C. in the temperature range between 40° C. and 60° C. As the result of the above-described control, the peak value $I_p$ of the oscillating current passing through the collector of the switching transistor 7 is reduced and accordingly, the amount of the anode current in the magnetron 12 is decreased. When the temperature of the switching transistor 7 is increased to or above 65° C., the switching transistor 7 is deenergized. Consequently, the amount of the anode current and that is, an amount of the microwave energy delivered is maintained at a constant value. Furthermore, the maintenance of the amount of the anode current at the constant value as described above is achieved by the provision of the temperature sensor 18 which is less expensive than the current transformer conventionally employed. Furthermore, the construction for insulation is simplified and consequently, the production cost of the microwave oven is reduced.

Additionally, since the transistor 7 is deenergized when the temperature thereof is increased to or above the predetermined value, deterioration of the switching transistor 7 may be restrained and therefore, the life of the microwave oven may be improved.

Although the control of the "on" period of the switching transistor 7 in the foregoing embodiment is initiated when the temperature of the switching transistor reaches 40° C., the control may be initiated at the temperature higher or lower than 40° C. Furthermore, the predetermined temperature value at which the switching transistor 7 is deenergized is not limited to 65° C.

The foregoing disclosure and drawings are merely illustrative of the principles of the present invention and are not to be interpreted in a limiting sense. The only limitation is to be determined from the scope of the appended claims.

What I claim is:

1. A high frequency heating apparatus comprising:
   a) rectification means for converting an AC voltage to a DC voltage;
   b) inverter means comprising a switching element and inductance coil means, the DC voltage from the rectification means being applied to the inductance coil means through the switching element which is turned on and off such that a high frequency voltage is obtained;
   c) a magnetron;
   d) a high frequency rectifying circuit for rectifying an AC voltage from the inverter means to a DC voltage and for applying it to the magnetron;
   e) control circuit means for controlling the "on" and "off" periods of the switching element so that the anode current of the magnetron is controlled;
   f) temperature sensing means for sensing the temperature of the switching element, thereby producing a temperature signal; and
   g) compensation means for compensating the "on" and "off" periods of the switching element in response to the temperature signal so that an increase in the magnetron anode current is restrained with an increase of the temperature of the switching element sensed by the temperature sensing means.

2. A high frequency heating apparatus according to claim 1, which further comprises deenergizing means for deenergizing the switching element when the temperature of the switching element sensed by the temperature sensing means exceeds a predetermined value.

* * * * *